May 15, 1928.

V. V. MESSER

TIRE TESTING MACHINE

Filed March 19, 1924

INVENTOR
VLADIMIR V. MESSER
BY
ATTORNEY

May 15, 1928.
V. V. MESSER
TIRE TESTING MACHINE
Filed March 19, 1924    6 Sheets-Sheet 2
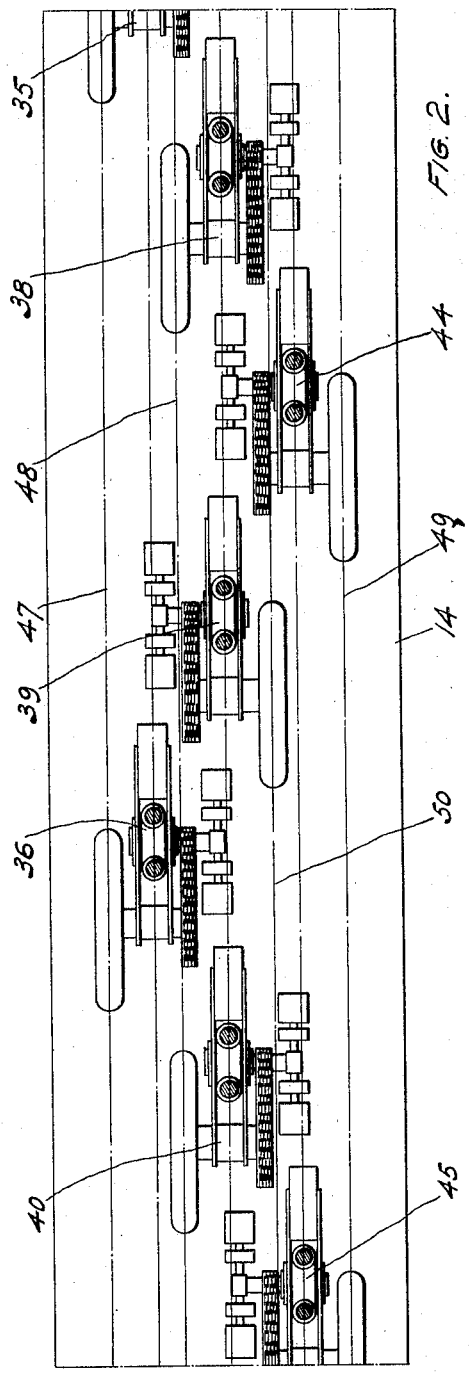
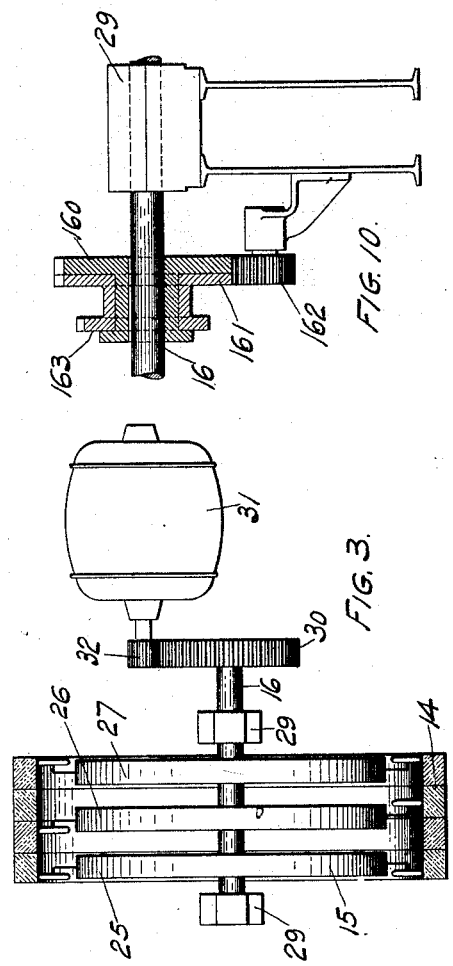
INVENTOR
Vladimir V. Messer
BY
ATTORNEY

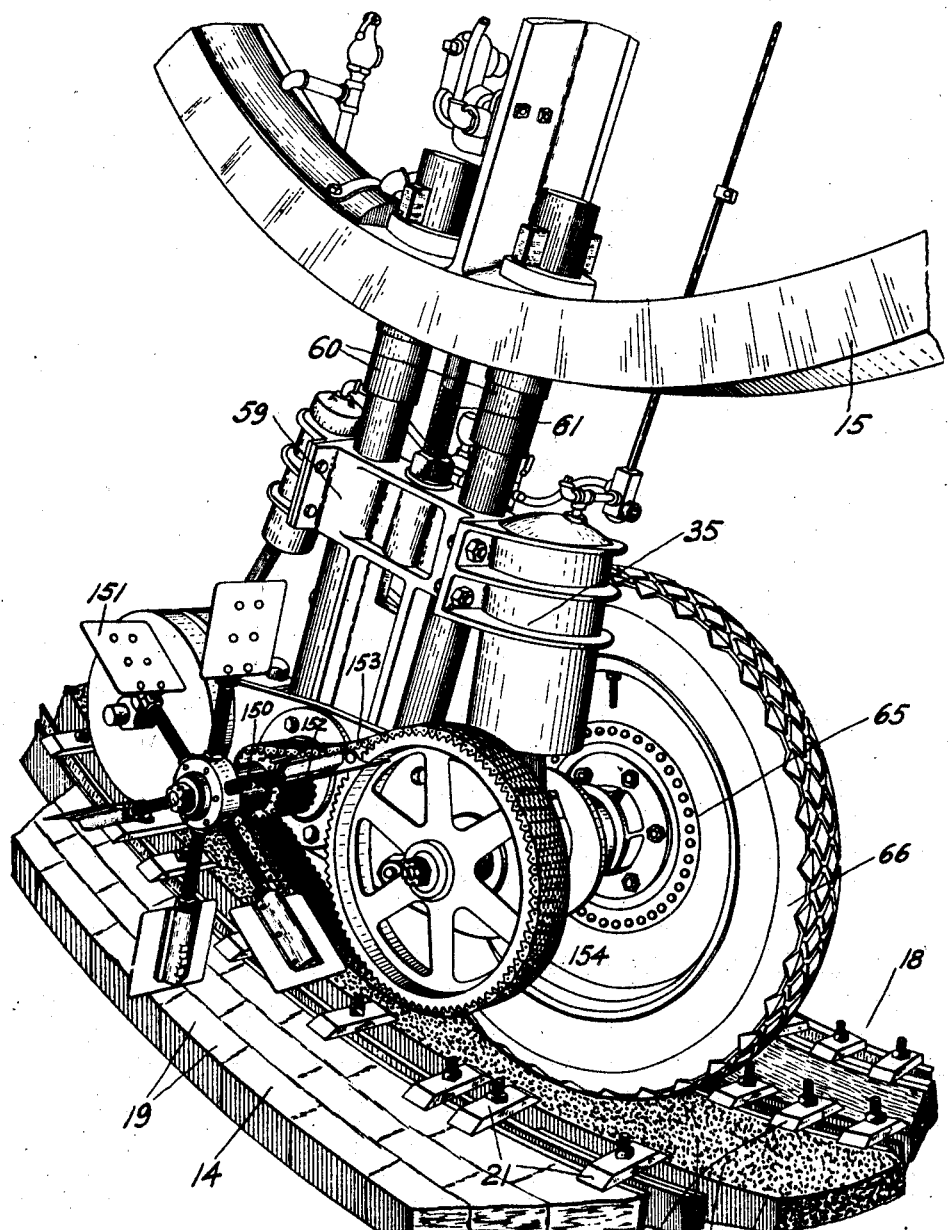

May 15, 1928. 1,669,622
V. V. MESSER
TIRE TESTING MACHINE
Filed March 19, 1924 6 Sheets-Sheet 5

INVENTOR
Vladimir V. Messer
BY
ATTORNEY

May 15, 1928.

V. V. MESSER 1,669,622

TIRE TESTING MACHINE

Filed March 19, 1924

INVENTOR
VLADIMIR V. MESSER.
BY
ATTORNEY

Patented May 15, 1928.

1,669,622

UNITED STATES PATENT OFFICE.

VLADIMIR VICTOR MESSER, OF DOUGLASTON, NEW YORK, ASSIGNOR TO THE GOODYEAR TIRE & RUBBER COMPANY, OF AKRON, OHIO, A CORPORATION OF OHIO.

TIRE-TESTING MACHINE.

Application filed March 19, 1924. Serial No. 700,432.

My invention relates to tire testing machines, and it has for its object to provide a novel type of machine by which tires may be tested in a minimum period of time under conditions closely approximating those existing under ordinary road or service conditions.

Heretofore, it has been necessary to test the treads of tires by means of actual road tests with the tires mounted upon automobiles, and to test the carcasses of tires either in the same manner or by mounting them in engagement with a power-driven metallic wheel provided with a projection mounted thereon which serves to crease the tire once for each revolution of the iron wheel.

The road test method of testing tires is objectionable for the reason that it requires a considerable period of time and probably no two tires are ever subjected to exactly the same conditions, and many of the tires being tested will receive treatment and abuse which differs very materially from that received by others. For that reason, the failure of a tire upon a certain machine will not even provide a test which is comparative with tires on other machines, or even with the other tires on the same machine, on account of the different conditions to which each is subjected. Also, it provides substantially no indication of what the same tire would accomplish under other conditions. The carcass test is practical, to a degree, but does not approximate road conditions. Also, no combined carcass and tread test can be run on a machine of the type heretofore employed.

By my invention I have eliminated the necessity for these lengthy unsatisfactory tests by the provision of a machine, by means of which tires may be tested in a minimum space of time under actual road conditions, and on surfaces of material similar to that of which roads are constructed. Also, my machine permits of subjecting a tire either to a tread test alone, a carcass test alone, or a combined tread and carcass test. Also, the effect of a braking action, or accelerating action, on the tires may be tested by means of a machine constructed in accordance with my invention.

With these and other objects in view, reference may now be had to the accompanying drawings for a more detailed description of my invention.

In the accompanying drawings, Fig. 1 is a side elevational view of a machine constructed in accordance with my invention, portions thereof being broken away for the sake of clearness.

Fig. 2 is a developed view of the separate units of the tire testing machine, the supports thereof being omitted for the sake of clearness.

Fig. 3 is a plan view of the entire testing machine, and the means for operating it, illustrating the disposition of the component parts thereof.

Fig. 4 is a perspective detail view of one of the units of my machine.

Fig. 10 is a detail view, partially in section and partially in elevation, of the control mechanism illustrated in Fig. 9.

Figures 1, 8:
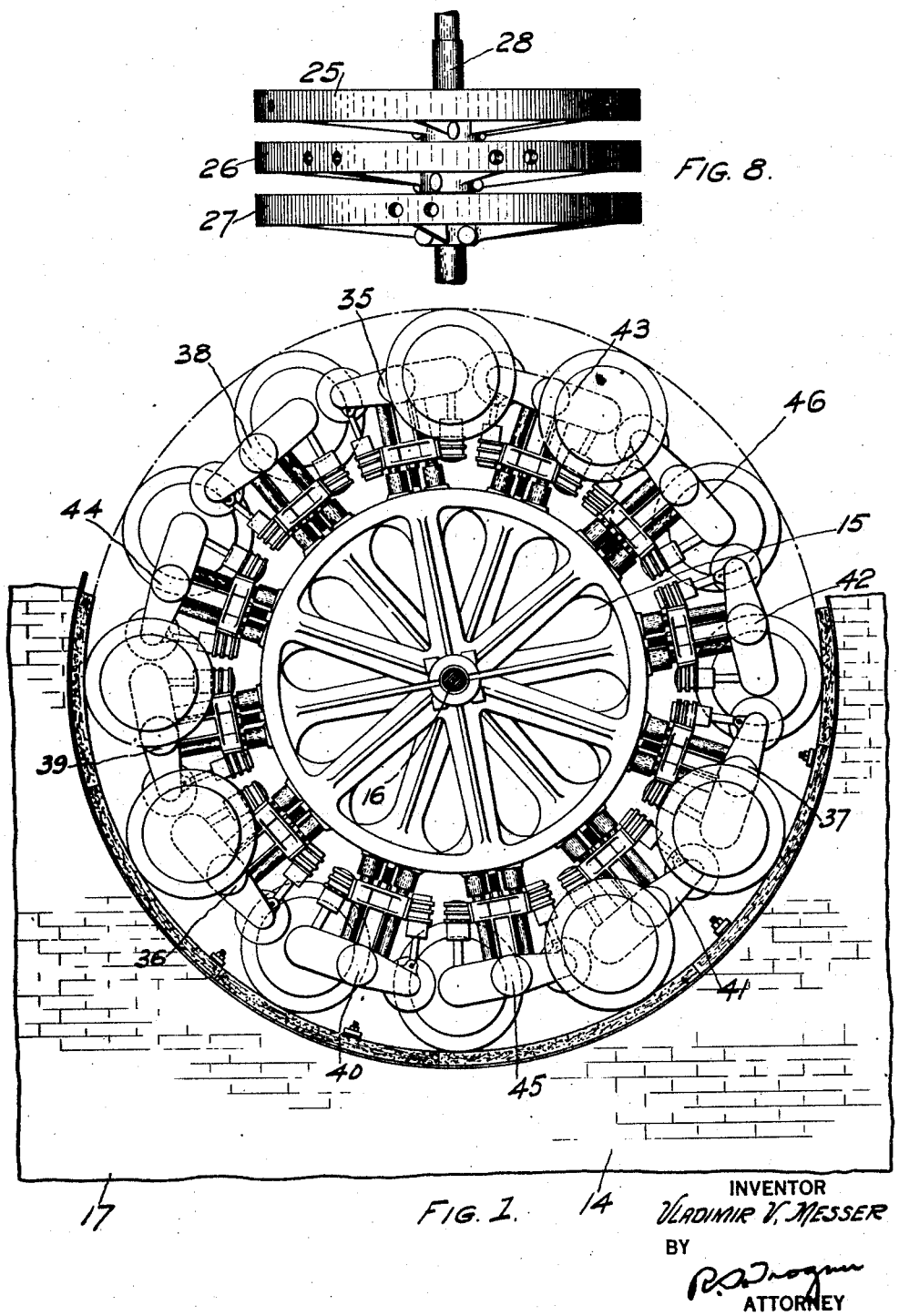
Fig. 8 is a plan view of the rotatable member illustrated in Fig. 1, with the tire supporting units detached therefrom.
Figure 5:
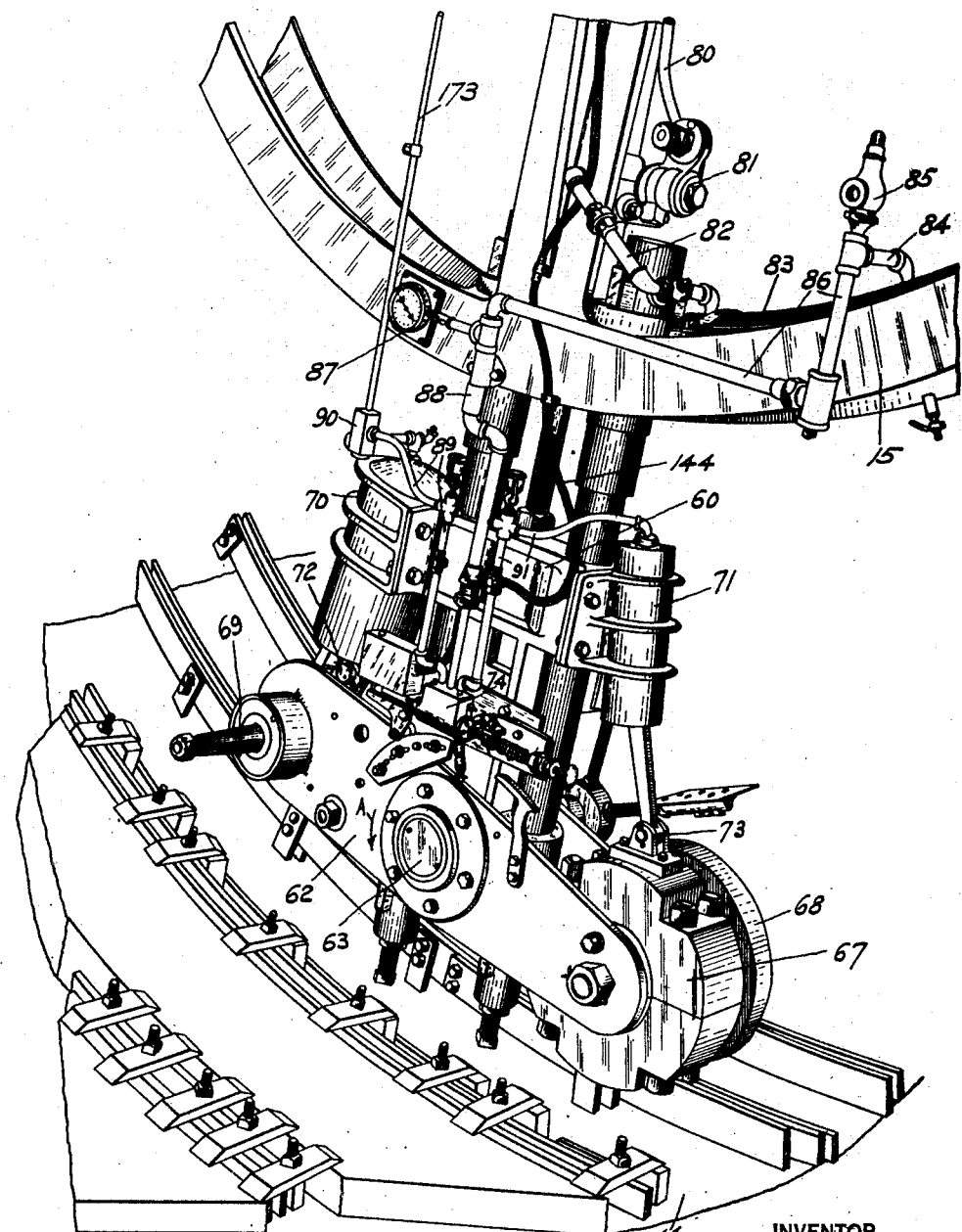
Fig. 5 is a perspective detail view of the unit illustrated in Fig. 4, the view being taken from the opposite side of the unit.

As illustrated in the drawings, my machine comprises a stator 14 and a rotor 15, mounted upon a rotatable shaft 16. The stator 14 comprises an annular supporting structure 17, within which is mounted a plurality of test tracks 18, as best illustrated in Fig. 4. The test tracks 18 are made in arcuate sections 19 which are mounted within recesses 20 provided therefor, by means of clamping members 21. The sections 19 may be composed of brick, gravel, asphalt, macadam, or any other representative road surface, and may be smooth or rough, as desired. Also, the sections may be arranged so as to provide an annular path or track, a portion of which is composed of one material, and another portion of another material.

The rotor 15 consists of three separate spider members 25, 26 and 27, all of which are mounted upon the shaft 16 which rotates within bearings 29, which constitute the portion of the stator 14. Mounted upon the shaft 16 is a gear wheel 30 which is driven from an electric motor 31 by means of a co-operating gear 32.

Mounted upon the end spider 25 are three equi-distantly spaced tire supporting units 35, 36 and 37. Mounted upon the centrally disposed spider 26 are six equi-distantly spaced tire supporting members 38, 39, 40, 41, 42 and 43. Mounted upon the third spider 27 are three equi-distantly spaced tire supporting units 44, 45 and 46. The units 35 to 46, inclusive, are so mounted with respect to the stator tracks 18 that the units 35, 36 and 37 move along an end track 47. The units 38, 40 and 42 move along a centrally disposed track 48 adjacent to the track 47. The units 44, 45 and 46 move along a track 49 disposed adjacent the opposite side of the stator 14; and the units 39, 41 and 43 move along a centrally disposed track 50 adjacent the track 49.

Each of the units 35 to 46, inclusive is alike, and each comprises a supporting structure 59 mounted upon one of the spiders 25, 26 or 27 by means of two radially extending supports 60, which project thereinto. The position of the member 59 upon the supports 60 may be adjusted by means of a threaded member 61, to adapt the unit for different size tires. The support 59 is provided with a tire supporting member 62 pivotally mounted thereon by means of a hollow axle or pin 63 of relatively large diameter. The member 62 is provided at one end with an axle 69, upon which is mounted a wheel 65 supporting a pneumatic tire 66, to be tested. Upon the other end of the member 62 is mounted a permanently attached counterbalance weight member 67, and a detachable weight member 68. The downward thrust exerted upon the one end of the member 62 by the combined weight of the members 67 and 68 should be exactly equal to that exerted on the other end by the weight of the wheel 65 and the tire 66, so that the member 62 balances evenly about the pivotal connection 63. In order to accomplish this, when a new tire is placed on the axle 64, the weight member 68 may be detached and another member of the desired weight substituted therefor, in order to make the member 62 balance.

Figures 6, 7:
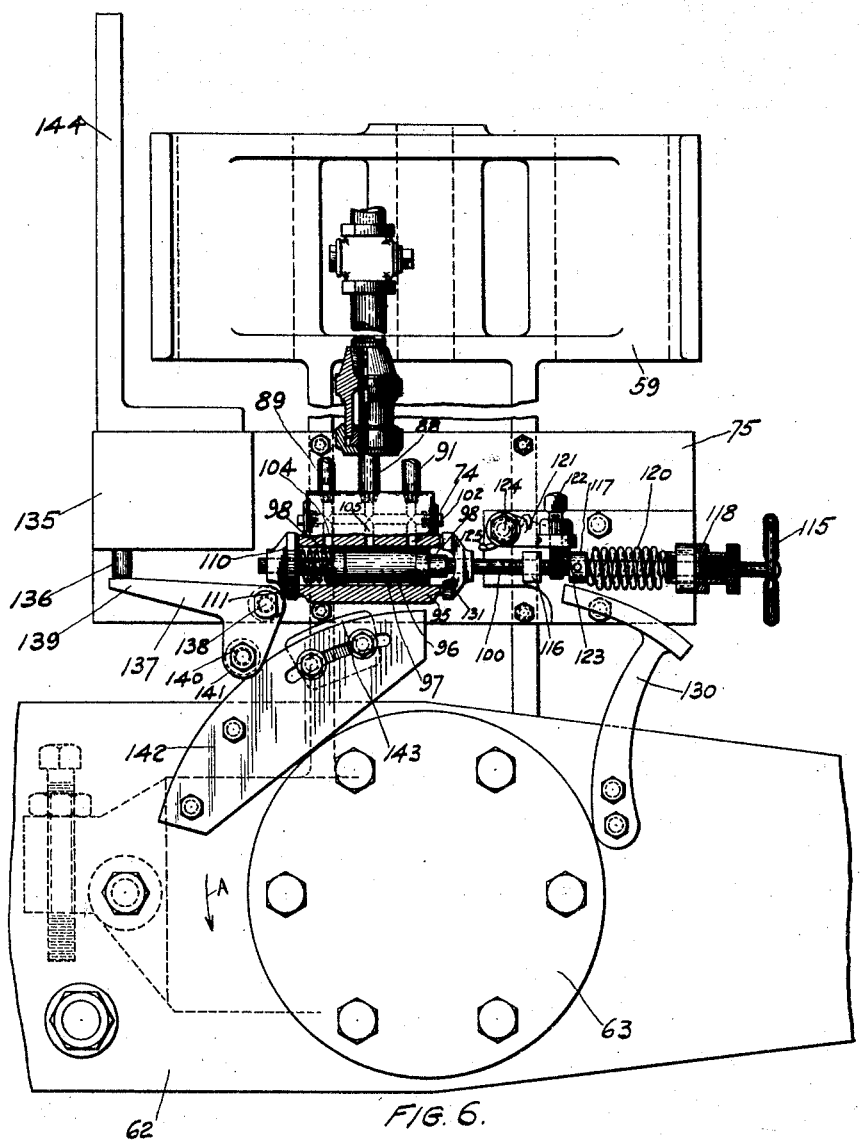
Fig. 6 is a view, partially in section and partially in elevation, of the control system of the individual units of the machine.
Fig. 7 is a cross-sectional view of the fluid valve illustrated in Fig. 6.
Figure 9:
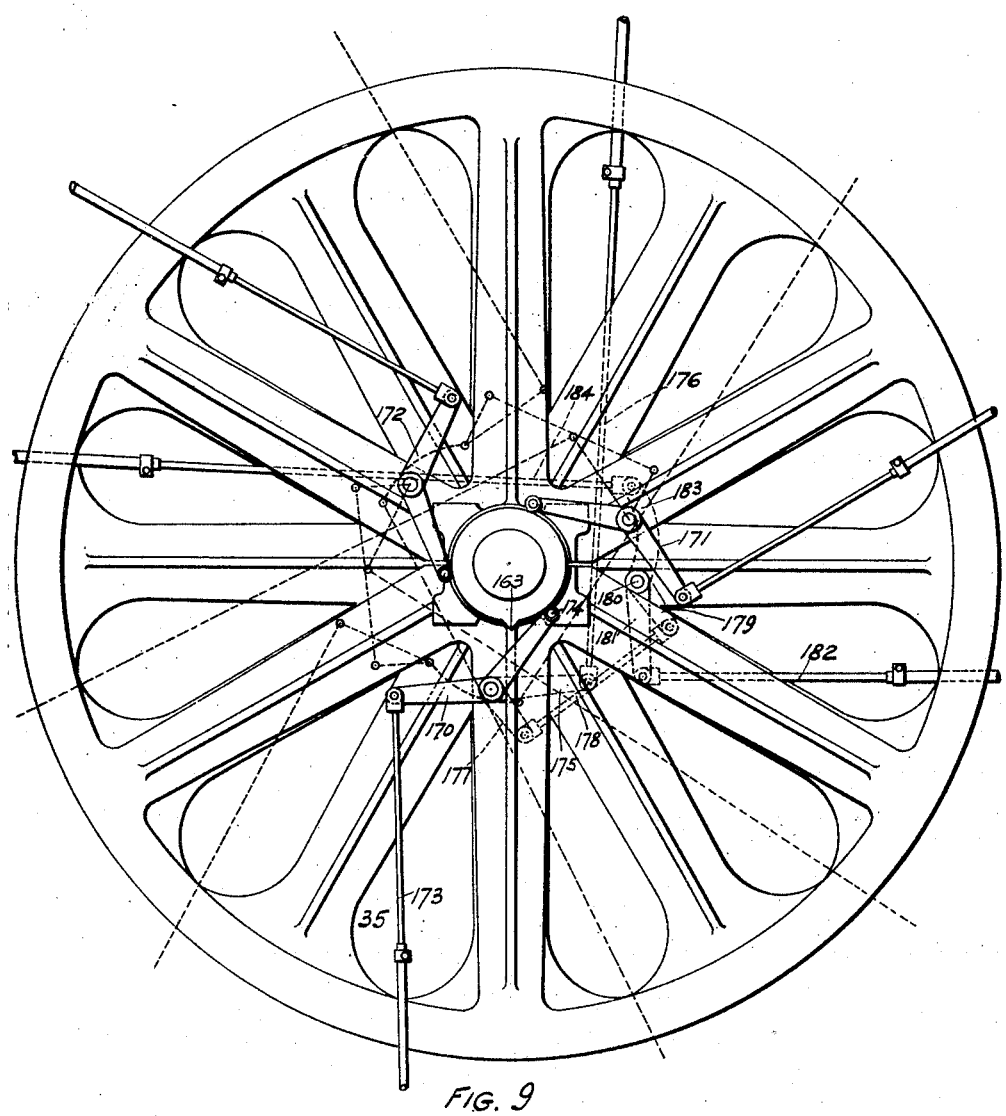
Fig. 9 is an elevational view of the spider illustrated in Fig. 8, illustrating in detail a controlling mechanism for the operation of the individual units of the machine.

Mounted upon the supporting structure 59 is a fluid actuated cylinder 70 of relatively large diameter, and, at the opposite side thereof, a fluid actuated cylinder 71 of relatively smaller diameter is attached. The piston of the cylinder 70 is connected to that end of the pivotally mounted member 62 upon which the wheel 65 is mounted, by means of a pivotal connection 72. In like manner, the piston of the cylinder 71 is connected to the opposite end of the member 62 through the counterbalance weight 67, by means of a pivotal connection 73. Air, or other suitable fluid, is employed to operate the cylinders 70 and 71, the actuations of which are controlled by means of a valve 74 mounted upon a supporting plate 75, which is secured to the member 59, as best illustrated in Figs. 6 and 7.

The cylinder 70 is employed for the purpose of exerting a pressure on the axle 69, and therefore on the tire 66, which pressure may be regulated so as to produce conditions equivalent to the weight imposed thereon by an automobile. The cylinder 71 is employed for the purpose of forcing the counterbalance 67 radially outward, thus raising the tire 66 out of contact with the track surface. The cylinders 70 and 71 are supplied with fluid from a suitable source of pressure, not shown, through a pipe 80 to a pressure regulating device 81, which regulates the pressure in the cylinder 70 and therefore the pressure exerted on the tire; thence through a pipe 82 to a reservoir 83, the pressure in which is maintained substantially constant by means of the regulating device 81. The reservoir 83 is connected through an outlet pipe 84 to a safety valve 85, and through pipes 86 to a pressure gage 87. The air, or other fluid, is conducted from the pressure gage 87, by means of a pipe 88, to the control valve 74. From the control valve 74, the fluid is conducted, by means of pipes 89, to a valve 90, and thence to the cylinder 70, and from the valve 74, by means of pipes 91, to the cylinder 71. The control valve 74 is so arranged that when one of the cylinders 70 or 71 is provided with fluid under pressure, the other is open to the atmosphere.

The control valve 74 consists of a cylinder 95, within which is adapted to move a piston member 96 having a central portion 97 of relatively small diameter, and end portions 98 of a diameter equal to the internal diameter of the cylinder 95. The piston 96 is mounted upon a rod 100 which is adapted for longitudinal movement with respect to the cylinder 95.

The cylinder feeding pipe 89 is connected, by means of a passageway 101, to a valve port 102 disposed at the end of the cylinder 95, opposite to the point of attachment of the pipe 89. In like manner, the pipe 91 is connected, by means of a passage 103, to a port 104, disposed at the opposite end of the cylinder 95. The supply pipe 88, which is in communication with the reservoir 83, is connected to a port 105. A relatively small spring 110 tends to hold the piston 96 in such position that air pressure is supplied directly from the port 105 to the port 102, thus supplying air from the reservoir 83 to the cylinder 70, which exerts a pressure upon the tire. This position of the piston 96 connects the cylinder 71 to the atmosphere by means of a by-pass 111 at the end of the cylinder 95.

Mounted upon the rod 100 is a handle 115, by means of which the piston 96 may be moved longitudinally. The rod 100 is also provided with two spaced collar members 116 and 117, and slides through a fixed collar member 118 which is adjustably mounted upon the supporting plate 75 which supports the air valve 74 and is rigidly mounted upon the supporting structure 60. Mounted upon the rod 100, between the collars 117 and 118, is a relatively large compression spring 120. Pivotally mounted upon the plate 75 is a member 121, which is provided with a set screw 122, for a purpose to be hereinafter described, and a latch member 123 which serves to engage the collar member 117 and retain it in such position that the spring 120 is maintained under compression. The member 121 is pivotally mounted upon a pin 124, and is normally maintained in its lowermost position by means of a torsion spring 125.

When the machine is operating normally, with the tire in contact with the test surface, the rod 100 is drawn outwardly to the position shown, by means of the handle 115, so as to compress the spring 120 and to permit passage of the air from the port 105 to the port 102. It is maintained normally in this position by means of the latch member 123.

In the event that the tire fails, or for any other reason becomes deflated, the pressure exerted thereon by the cylinder 70 causes the lever 62 to move in a direction indicated by the arrow "A". The lever 62 is provided with a fixedly mounted cam member 130 which is moved, by the rotation of the member 62, about the pivotal point of the member 62 into engagement with the set screw 122. This raises the member 121 to such point that the latch member 123 moves out of the path of the collar member 117. Thereupon, the spring 120 immediately moves the rod 100 and the piston member 96 inwardly, so as to compress the spring 110. This movement of the piston 96 serves to open the port 102 to the atmosphere, by means of a by-pass 131, and serves to connect the port 105 to the port 104, thereby causing air to pass through the reservoir 83 to the cylinder 71. The cylinder 70 being de-energized, and the cylinder 71 being actuated by the pressure admitted thereto by the valve 74, the piston of the cylinder 71 moves outwardly, thus raising the tire from contact with the track surface. Thus, in the event of the failure, of any type, of the tire, it is raised from the test surface, preventing possible injury from rim cuts, which might interfere with the test data desired on the particular tire.

In order that the rotor may be stopped, in the event of the failure of any of the tires, and in order that an accurate record may be kept of the exact mileage to which each tire was subjected, my machine is also provided with an electrical controlling device. Mounted upon the plate 75 is an electrical switch 135, provided with an operating button 136. A bell crank lever 137 is also mounted upon the plate 75, by means of a pivotal connection 138, in such manner that one end 139 thereof may engage the switch button 136. The lever 137 is provided at its opposite end 140 with a roller member 141. Mounted upon the pivotally mounted member 62 is a plate 142, and adjustably mounted thereon is a cam surface 143. The cam surface is so positioned that when a tire becomes deflated, and the wheel supporting end of the member 62 moves outwardly, as indicated by the arrow "A", under force of the cylinder 70, the cam surface 143 engages the roller member 141, causing the member 139 to press the switch member 137 inwardly, thus energizing an electrical circuit 144, which in turn interrupts the power circuit to the main driving motor 31, thus stopping the rotor 15. Thus, it will be observed that, in the event of a failure and consequent deflation of any one of the tires undergoing test, the flow of power which operates the rotor is immediately interrupted, thus causing the rotor to stop, but, in the meantime, in order to prevent the possibility of rim cutting, the tire is raised from the track surface.

Rotatably mounted within the hollow shaft 63 is a shaft 150, upon which is mounted a fan member 151 and a gear wheel 152. The shaft 150 is rotated by means of a toothed belt 153, which engages the gear wheel 152 and is operated by a gear wheel 154 mounted upon the shaft 64, which also supports the tire 66. By means of the fan 151, a certain retarding drag, or load, is transmitted to the tire 66, which tends to rotate freely upon the shaft 64 when the rotor is moved. This drag approximates very closely the normal pull exerted on a wheel upon an automobile by the motor thereof.

Mounted upon the main shaft 16 is a gear wheel 160, upon which is rotatably mounted an additional gear wheel 161 of equal diameter therewith. The gear wheel 160 is provided with a relatively large number of teeth, and the gear wheel 161 is provided with a slightly smaller number. Both gears mesh with an idling rotatable gear 162, which is supported upon the rotor frame 15. Integral with the gear wheel 161 is a cam member 163, for a purpose to be hereinafter set forth.

Pivotally mounted at equi-distant points upon the frame of the rotor 15 are three bell crank levers 170, 171 and 172. Each lever is connected at one end to an actuating rod, as indicated at 173, which serves to actuate the air valves 90 of the respective groups of units. Upon the other end of each of the bell crank levers 170, 171 and 172 is mounted a roller member, as indicated at 174, which is engaged by a projection upon the cam 163 to actuate the valve operating members 173. Each of the members 170, 171 and 172 is connected, by means of a suitable lever arrangement, to four equi-distantly spaced tire supporting units. For example, the lever 170 is connected by means of the rod 173 to the unit 35, and is connected by the lever 175 to a rod 176, connected to the unit 45, and by means of a lever 177, a connecting rod 178, and a lever 179 to a pin 180, which in turn is connected by means of a lever 181 to a rod 182 which is connected to the unit 39, and by means of a lever 183 and a rod 184 to the unit 42.

When the rod 173 is actuated by means of the cam 163 it is drawn upwardly, thus closing the air supply from the pipes 89 to the cylinders 70 and opens the cylinders 70 to the atmosphere, in the units 35, 45, 39 and 42, simultaneously. This releases the pressure on the wheel, and on the lever 62. The air pressure within the tire immediately causes the end 62 to spring away from the track surface which it is engaging. As soon as the point of the cam 163 has moved beyond the roller end 174 of the bell crank lever 170, the lever 173 is again moved outwardly, thus again restoring the air connection from the pipes 89 to the cylinder 70, thus causing the tire to again engage the track.

By the interconnection of the levers and rods 170 to 183, inclusive, four tire units equi-distantly spaced about the rotor are raised simultaneously, thus preventing any shock to the machine by reason of having unbalanced forces applied thereto by decreasing the pressure exerted on the rotor by the cylinder 70 of one of the units, without decreasing the pressure in a diametrically opposite unit. The forces exerted by the various units will at all times be exactly opposed, thus preventing the possibility of the imposition of unbalanced forces upon the shaft 16.

It will be noted that, by reason of the arrangement of the gears 160 and 161, the cam 163 will move relatively slowly upon the gear 160. In actual operation, it has been found desirable to have the teeth on the two gears so proportioned that the cam will make approximately 59 revolutions during the time that the gear 160 is completing 60 revolutions. The bell crank levers 170, 171 and 172, being mounted upon the rotor frame, will, during the same time, complete 60 revolutions, thus causing these levers to be actuated approximately once in 60 revolutions of the rotor 15. During the time that the tire is out of engagement with the track which ordinarily is approximately one second, the drag of the fan 151 will tend to decrease the peripheral speed thereof, materially below the peripheral speed of the rotor member, thus causing the tire to engage the track at a materially different speed from that at which the rotor is moving. This arrangement causes an action very similar to that exerted upon the tire when an automobile is started from a stationary position and brought to a running condition, or when it is stopped by means of brakes from a running to a stationary position.

From the foregoing description, it will be apparent that I have approximated in a testing machine the actual conditions under which a tire is used on the road. Also, it is obvious that any desired type of road surface, or combination of road surfaces, may be employed for the test, and that during the test the tire is submitted to conditions representing exactly those caused by the pull of the motor, and those caused by the starting and stopping of the machine by means of brakes. Furthermore, it will be apparent that by means of the electrical stopping mechanism, the machine is stopped immediately upon the failure of any of the tires, so that an accurate record of the conditions to which it has been subjected may be kept without having an operator in constant attendence. Also, by means of the safety arrangement, the tire cannot be subjected to rim cuts, irrespective of the conditions which may obtain.

It will be observed from my description that, although my invention is particularly adapted for the testing of pneumatic tires, it is not limited thereto, but solid and semi-pneumatic tires may equally well be tested thereon, the only effect of such a transition being that the need of the tire saving apparatus upon deflation is materially decreased.

Any type of obstruction may be placed in the path of the tire, by bolting a bar or rod across the tire track, thus providing a test which approximates the results secured by operating a vehicle on very uneven ground, over street-car tracks and the like.

Although I have illustrated but a single form of my invention, and have described in detail but a single application thereof, it will be apparent to those skilled in the art that it is not so limited but that various minor modifications and changes may be effected therein without departing from the spirit of my invention or from the scope of the appended claims.

What I claim is:

1. A tire testing machine comprising an endless concave track and means for moving a tire bodily in a plane substantially normal to the surface of the track.

2. A tire testing machine comprising an endless stationary track, and means for supporting a tire and rolling it substantially normal to the internal surface of the track.

3. A tire testing machine comprising an endless concave testing track, and means for supporting a tire and causing it to roll normally to the concave surface of said track.

4. A tire testing machine comprising an endless testing track, and means substantially concentric therewith for supporting a tire in the plane of said track.

5. A tire testing machine comprising an endless track support, arcuate sections having concave test surfaces, and means for attaching said sections to the internal surface of said support.

6. A tire testing machine comprising an endless concave track, and a relatively rotatable tire supporting mechanism comprising means for supporting a plurality of tires disposed in alinement and for bodily rolling them successively over the internal surface of the track.

7. A tire testing machine comprising an endless arcuate track, and a relatively rotatable tire supporting mechanism comprising means for supporting a plurality of tires disposed in planes perpendicular to the axis of rotation of the mechanism and for bodily rolling them successively over said track under load.

8. A tire testing machine comprising a plurality of concave surfaces disposed in side-by-side relationship, to form a plurality of endless tracks and a relatively rotatable tire supporting mechanism comprising means for supporting a plurality of tires and for rolling them over said tracks.

9. A tire testing machine comprising an endless annular track, a relatively rotatable member comprising means for supporting a tire and causing it to roll in the plane of the track over the internal surface thereof, and means for approximating usual operating conditions.

10. A tire testing machine comprising an endless annular track, a relatively rotatable member comprising means for supporting a tire and causing it to roll in the plane of the track over the internal surface thereof, and means for exerting load conditions on said tire.

11. A tire testing machine comprising an annular track, a relatively rotatable member comprising means for supporting a tire and causing it to roll over said track, and means dependent upon the deflation of the tire for moving it out of contact with said track.

12. A tire testing machine comprising an annular track, a relatively rotatable member comprising means for supporting a tire and causing it to roll over said track, and means for automatically moving the tire out of contact with the track upon a decrease in the air pressure within the tire.

13. A tire testing machine comprising an annular track, a relatively rotatable member comprising means for supporting a tire and causing it to roll over said track, means for rotating said rotatable member, and means for automatically stopping said member upon deflation of the tire.

14. A tire testing machine comprising an annular track, a relatively rotatable member comprising means for supporting a tire and causing it to roll over said track, means for rotating said rotatable member, and means for automatically moving said tire out of contact with the track and for stopping said rotatable member upon deflation of the tire.

15. A tire testing machine comprising means for testing a plurality of tires simultaneously, and means for automatically interrupting the operation of said machine upon the deflation of any of the tires being tested.

16. A tire testing machine comprising means for subjecting a plurality of tires simultaneously to a test approximating actual road conditions, and means for automatically interrupting the test upon the failure of any one of the tires undergoing the test.

17. A tire testing machine comprising means for subjecting a plurality of tires simultaneously to a test approximating actual road conditions, and means for automatically stopping the machine upon the failure of any one of the tires undergoing test.

18. A tire testing machine comprising an endless stationary annular track, a rotatable tire supporting member, means for mounting a plurality of tires thereupon in planes perpendicular to the axis of the member and in engagement with said track, and means for rotating said member.

19. A tire testing machine comprising an endless stationary annular track, a rotatable tire supporting member, means for mounting a plurality of tires thereupon on planes perpendicular to the axis of the member and in engagement with said track, and means for driving said member and for regulating the speed thereof.

20. A tire testing machine comprising a stationary annular track, a rotatable tire supporting member, means for mounting a plurality of tires upon said member in the plane of the track and in engagement therewith, and means for causing each of the tires independently to engage said track with a predetermined pressure.

21. A tire testing machine comprising a stationary annular track, a rotatable tire supporting member, means for mounting a plurality of tires upon said member and in engagement with said track, means for driving said rotatable member, means for causing each of the tires to engage said track at a predetermined pressure, and means for releasing the pressure upon any tire upon the failure thereof.

22. A tire testing machine comprising a stationary annular track, a rotatable tire supporting member, means for mounting a plurality of tires upon said member and in engagement with said track, means for driving said rotatable member, means for causing each of the tires to engage said track at a predetermined pressure, means for removing any tire from engagement with the track upon failure thereof, and means for stopping the rotatable member upon failure of any tire.

23. A tire testing machine comprising a stationary annular track, a rotatable tire supporting member, and means for mounting a tire upon said rotatable member comprising a pivotally mounted arm provided with a wheel axle upon one end thereof and adapted to receive a counterbalancing weight upon the other end thereof.

24. A tire testing machine comprising a stationary annular track, a rotatable tire supporting member, and means for mounting a tire upon said rotatable member comprising a pivotally mounted arm provided with a wheel axle upon one end thereof and adapted to receive a counterbalancing weight upon the other end thereof, and fluid actuated means adapted to press the tire towards the track.

25. A tire testing machine comprising a stationary annular track, a rotatable tire supporting member, and means for mounting a tire upon said rotatable member comprising a pivotally mounted arm provided with a wheel axle upon one end thereof and adapted to receive a counterbalancing weight upon the other end thereof, and fluid actuated means adapted to raise the tire from the track.

26. A tire testing machine comprising a stationary annular track, a rotatable tire supporting member, and means for mounting a tire upon said rotatable member comprising a pivotally mounted arm provided with a wheel axle upon one end thereof and adapted to receive a counterbalancing weight upon the other end thereof, a fluid actuated cylinder adapted to press the tire towards the track, and an additional fluid actuated cylinder adapted to raise the tire from the track.

27. A tire testing machine comprising a stationary annular track, a rotatable tire supporting member, and means for mounting a tire upon said rotatable member comprising a pivotally mounted arm provided with a wheel axle upon one end thereof and adapted to receive a counterbalancing weight upon the other end thereof, a fluid actuated cylinder adapted to press the tire towards the track during normal operation of the machine, and an additional fluid actuated cylinder adapted to raise the tire from the track upon failure of the tire.

28. A tire testing machine comprising a stationary annular track, a rotatable tire supporting member, and means for mounting a tire upon said rotatable member comprising a pivotally mounted arm provided with a wheel axle upon one end thereof and adapted to receive a counterbalancing weight upon the other end thereof, a fluid actuated cylinder adapted to press the tire towards the track during normal operation of the machine, an additional fluid actuated cylinder adapted to raise the tire from the track upon failure of the tire, and additional electrical means for stopping said machine upon failure of the tire.

29. A tire testing machine comprising an endless vertical annular stationary track, a rotatable member concentrically disposed within said track comprising means for supporting a plurality of tires in a single vertical plane and in contact with said track, and means for driving said rotatable member.

30. A tire testing machine comprising an endless vertical stationary structure, a plurality of annular tracks attached therein, a rotatable member concentrically disposed within said structure comprising means for supporting a plurality of rows of tires disposed in spaced vertical planes in contact with said tracks, and means for driving said rotatable member.

31. A tire testing machine comprising an endless annular track, a relatively rotatable member comprising means for supporting a tire and causing it to roll over said track, and means for exerting a braking action on the member supporting the tire.

32. A tire testing machine comprising an endless vertical annular stationary track, a rotatable member concentrically disposed within said track comprising means for supporting a plurality of tires in a single vertical plane and in contact with said track, means for driving said rotatable member, and means for exerting a braking action on said tires.

33. A tire testing machine comprising an annular track, a relatively rotatable member provided with means for supporting a tire in engagement with the track, means for driving said rotatable member, and means adapted to permit the removal of the tire from the track at predetermined intervals during the normal operation of the machine.

34. A tire testing machine comprising an annular track, a relatively rotatable member provided with means for supporting a tire in engagement with the track, means for driving said rotatable member, and means for raising the tire from the track at predetermined intervals during the normal operation of the machine.

35. A tire testing machine comprising an annular track, a relatively rotatable member provided with means for supporting a tire in engagement with the track, means for driving said rotatable member, and means for raising the tire out of contact with the track and subsequently restoring it to contact therewith during the normal operation of the machine.

36. A tire testing machine comprising an annular track, a relatively rotatable member provided with means for supporting a tire in engagement with the track, means for driving said rotatable member, and means for raising the tire out of contact with the track, retarding the speed of the tire to less than the peripheral speed of the rotatable member and subsequently restoring the tire to contact with the track during normal movement of the rotatable member.

37. A tire testing machine comprising a stationary annular track, a rotatable tire supporting member, means for mounting a plurality of tires upon said member and in engagement with said track, means for causing each of the tires to engage said track with a predetermined pressure, and means for releasing said pressure at predetermined intervals during the normal operation of the machine.

38. A tire testing machine comprising a stationary annular track, a rotatable tire supporting member, means for mounting a plurality of tires upon said member and in engagement with said track, means for causing each of the tires to engage said track with a predetermined pressure, and means for releasing said pressure and subsequently reapplying it at predetermined intervals during the normal operation of the machine.

39. A tire testing machine comprising a stationary annular track, a rotatable tire supporting member, means for mounting a plurality of tires in equi-angularly spaced position upon said member and in engagewith said track, means for rotating said member, and means for causing a plurality of tires in diametrically opposed positions to be moved out of contact with said track and to subsequently be restored to contact with said track, and means for retarding the speed of said tires during the period they are out of contact with the track.

40. A tire testing machine comprising a plurality of major parts, one of the parts being provided with an endless concave surface, means on the other part for supporting a tire normally to the concave surface, and means for rotating one of the parts to cause relative movement between the tire and the concave surface.

In witness whereof, I have hereunto signed my name.

VLADIMIR VICTOR MESSER.